US008686909B2

(12) United States Patent
Frank et al.

(10) Patent No.: US 8,686,909 B2

(45) Date of Patent: Apr. 1, 2014

(54) VAULT ANTENNA FOR WLAN OR CELLULAR APPLICATION

(75) Inventors: Peter Frank, Ottawa (CA); Roland A. Smith, Napean (CA); Dave Pell, Carp (CA); Stephen Rayment, Ottawa (CA)

(73) Assignee: BelAir Networks Inc. (CA)

( * ) Notice: Subject to any disclaimer, the term of this patent is extended or adjusted under 35 U.S.C. 154(b) by 606 days.

(21) Appl. No.: 12/870,259

(22) Filed: Aug. 27, 2010

(65) Prior Publication Data

US 2011/0077036 A1 Mar. 31, 2011

Related U.S. Application Data

(60) Provisional application No. 61/237,822, filed on Aug. 28, 2009.

(51) Int. Cl.
*H04B 7/00* (2006.01)
*H01Q 19/10* (2006.01)

(52) U.S. Cl.
USPC ........... 343/761; 343/719; 343/834; 343/839; 455/507

(58) Field of Classification Search
USPC ........................... 455/507; 343/761, 834, 839
See application file for complete search history.

(56) References Cited

U.S. PATENT DOCUMENTS

| | | | | |
|---|---|---|---|---|
| 3,815,138 | A * | 6/1974 | Haley | 343/754 |
| 5,162,811 | A * | 11/1992 | Lammers et al. | 343/915 |
| 5,283,591 | A | 2/1994 | Delmas | |
| 5,298,894 | A * | 3/1994 | Cerny et al. | 340/870.02 |
| 5,797,082 | A | 8/1998 | Lusignan | |
| 7,126,477 | B2 | 10/2006 | Gallivan et al. | |
| 2004/0219924 | A1 | 11/2004 | Flynn | |
| 2007/0026796 | A1 * | 2/2007 | Mizushina et al. | 455/40 |
| 2009/0196221 | A1 * | 8/2009 | Horn et al. | 370/328 |

OTHER PUBLICATIONS

Transmittal; International Search Report; and Written opinion of the International Searching Authority for International Application No. PCT/CA2-010/001302, with a mailing date of Dec. 8, 2010.

* cited by examiner

*Primary Examiner* — Jerome Jackson, Jr.
*Assistant Examiner* — Andrea Lindgren Baltzell
(74) *Attorney, Agent, or Firm* — Katten Muchin Rosenman LLP

(57) ABSTRACT

A fringe-effect vault antenna includes a communications vault having a non-conductive cover disposed substantially at ground level. An antenna element is positioned in the communications vault. A metallic reflector has an edge, positioned substantially parallel to the ground, where the metallic reflector and the edge are configured to cause an edge diffraction, or "fringe-effect" upon the RF fields of the antenna to cause those RF fields to diffract in a direction toward the ground.

23 Claims, 13 Drawing Sheets

Fig. 4
E-FARFIELD
15
10
5
0
-5
-10
-15
-20
-25
-30
dB
0 DEGREES
15 DEGREES
30 DEGREES
45 DEGREES
-90-85-80-75-70-65-60-55-50-45-40-35-30-25-20-15-10 -5 0 5 10 15 20 25 30 35 40 45 50 55 60 65 70 75 80 85 90
ANGLE IN DEGREES

Optionally:

VAULT ANTENNA FOR WLAN OR CELLULAR APPLICATION

BACKGROUND OF THE INVENTION

Field of the Invention

The present invention provides an innovative antenna system for underground vaults. It addresses the important requirement of ground level azimuth coverage, while providing the means to achieve elevation coverage as required. It also addresses the means of mass producing low cost antenna solutions for widespread microcell deployments while addressing the technical issues associated with underground vaults.

Ground level vaults are widely employed by service providers such as cable television providers, or telephone providers, to access buried plant equipment and cable. These vaults are typically positioned to be flush with the ground level, and are found throughout metropolitan areas where cable or telecom equipment is located.

With the proliferation of wireless local area networks or WLANs, there has been an increase in requirements to find cost effective means to deploy access points using various "assets" available to service providers. One key asset which many service providers have in abundance is underground vaults.

The present invention provides a means of providing repeatable and optimized radio frequency (RF) coverage using vaults as the source of the radiating element. As is well known in the industry, good RF coverage usually relies on antennas to be mounted at high elevations, such as on a pole or roof top. Most cities have hundreds or thousands of cell towers or roof top "macro-cells" consisting of high powered transmitters of 40 W-per-radio channel with large high gain antennas. These macro-cells provide cellular coverage extending hundreds to thousands of meters. Many radio propagation models are published detailing the empirical tradeoff of antenna height with respect to cellular coverage. This is a well known and documented science.

As the cellular revolution has progressed, and the number of cellular users has grown, more cost effective lower power (i.e., up to 4 W) base stations have been introduced to provide smaller cellular coverage zones of a few hundred meters. Mounting of equipment on light poles, and street level assets such as bulletin boards or building walls, have become a cost effective means of achieving cellular underlay networks, used to offload the capacity of the macro-cellular network. Cell coverage areas of less than a few hundred meters have not been considered, in part due to the high costs of the micro-cells, but also due to the high leasing cost of the mounting assets.

The cellular revolution has progressed with the introduction of "pico-cells" and "nano-cells"; however, neither of these two types of base stations has been used in any significant way for outdoor cellular coverage. Pico-cellular base stations have not yet found a practical use in the industry. However, nano-cell base stations have successfully found a significant market penetration for indoor residential applications.

Wireless LAN systems have risen as a disruptive technology to cellular systems. WLAN systems employ unlicensed spectrum and offer data throughput levels which are two orders of magnitude higher than commercially deployed cellular systems. WLAN systems also have lower transmitter power (i.e., typically less than 4 W EIRP) and operate in an uncontrolled unlicensed spectrum and cannot readily be deployed using macro cells roof tops or cell towers. Outdoor WLAN systems have typically been deployed by attaching the WLAN transceivers to street light poles or handing these transceivers on cable plant in the same fashion that cable amplifiers or DSL repeaters are deployed and powered. These WLAN systems typically provide coverage radii of hundreds of meters. Smaller cells have been deployed inside specific venues such as Starbucks or McDonald's. These coverage areas are very small—having radii in the range of tens of meters up to one hundred meters, but cost effective due to the low equipment costs of the WLAN transceivers.

Many venues have been found which had no above ground assets upon which to place a WLAN transceiver. These venues include communities with no aerial plant or above-ground power or communications poles. In some areas, poles may exist, but municipal regulations prohibit the deployment of equipment on the poles, as a regulation to minimize visible clutter. In all of these areas, the same services are typically carried, but are buried and carried through under ground conduits, accessible only at pedestals, metal service cabinets, or at ground level vault locations. Accordingly, the present invention addresses this shortcoming.

SUMMARY OF THE INVENTION

In one aspect, the invention provides a fringe-effect vault antenna. The antenna comprises: at least one antenna element positioned in an underground vault, the vault having a non-conductive vault cover; an antenna mount; and a metallic reflector having a metallic edge, the edge being positioned substantially parallel to the ground surface, and the metallic reflector being configured to cause a fringing-effect upon received radio frequency signals and to direct the received radio frequency signals toward the at least one antenna element.

The non-conductive vault cover may comprise a material selected from the group consisting of concrete, concrete polymer, and plastic. The antenna mount may be attached to the vault cover. Alternatively, the antenna mount may be supported by a structure of the vault. The fringe-effect vault antenna may further include a sloped bracket configured to further direct the received radio frequency signals toward the metallic reflector.

The fringe-effect vault antenna may further include a tilt structure for tilting an elevation of the antenna such that a main beam of a received radio frequency signal is positioned toward an edge of the vault cover. The fringe-effect vault antenna may further include an azimuth tilt structure configured for tilting an azimuth of the antenna. The fringe-effect vault antenna may further include a diffraction antenna bracket and an adjusting structure configured for adjusting an elevation or a slope of the diffraction antenna bracket such that a main beam of the antenna can be steered. The fringe-effect vault antenna may further include a mounting bracket for enabling the antenna to be mounted either lengthwise or widthwise such that a directionality of the antenna can be positioned toward any side of the vault. The fringe-effect vault antenna may further include a bell jar attached to the vault cover, the bell jar being configured to maintain an air pocket around the at least one antenna element.

The fringe-effect vault antenna may be selected from the group consisting of an omni-directional fringe-effect vault antenna, a directional fringe-effect vault antenna, a parabolic fringe-effect vault antenna, and a corner reflecting fringe-effect vault antenna.

In another aspect, the invention provides a vault antenna system. The system comprises: at least one antenna element;

a vault cover; a deflector plate; and a radio frequency cable. The at least one antenna element, the deflector plate, and the radio frequency cable are integrated together into the vault cover. The radio frequency cable is configured to couple energy from a received radio frequency signal into the at least one antenna element.

In yet another aspect, the invention provides a system for providing WLAN or cellular radio coverage. The system comprises: at least one wireless transceiver; a means of wired connectivity; and a fringe effect vault antenna. The antenna comprises: at least one antenna element positioned in an underground vault, the vault having a non-conductive vault cover; an antenna mount; and a metallic reflector having a metallic edge, the edge being positioned substantially parallel to the ground surface, and the metallic reflector being configured to cause a fringing effect upon received radio frequency signals and to direct the received radio frequency signals toward the at least one antenna element.

The means of wired connectivity may be selected from the group consisting of DOCSIS, DSL, ADSL, HDSL, VDSL, T1, and E1. The at least one antenna element may be configured to enable wide-band multi-carrier operation. The at least one wireless transceiver may include a plurality of wireless transceivers, and the at least one antenna element may include a plurality of antenna elements, each of the plurality of antenna elements corresponding to a different one of the plurality of wireless transceivers.

DETAILED DESCRIPTION OF THE INVENTION

WLAN solutions have been deployed inside above ground pedestals and in above-ground cabinets. These solutions maximize cell coverage, achieving reaches of 150 m-300 m depending on ground level clutter. Advanced multiple input-multiple output (MIMO) radio features and antennas can extend this coverage; and deployment redundancy is the main means used to ensure that clients using these systems are rarely affected by ground level propagation impairments.

The present invention addresses the specific aspect of ground level vaults as a means of providing WLAN coverage. These vaults have not typically been used in the cellular industry for outdoor coverage, and hence there has been no available literature or science developed for optimal radio or antenna solutions. The key issue associated with using ground level vaults is the ability to provide ground level coverage—that is, the ability to provide acceptable antenna gain along the street so that pedestrians and local businesses will see radio coverage from the vault.

To tackle this problem, simulation tools have been used to simulate a variety of antenna solutions which could be readily deployed in the vault. The goal has been to achieve a coverage radius of greater than 100 meters of street level coverage from a single vault, so that specific venues could be covered in a cost-effective manner using a few wireless transceivers. In a preferred embodiment, these transceivers employ DOCSIS 2.0 backhaul for connection to the Internet, and are plant-powered from 40-90 VAC supplied over the main feeder networks of the cable service providers. However, in an alternative embodiment, this system could employ DOCSIS 3.0, DSL, VDSL, HDSL or other means connected to the Internet, and could employ standard AC powering such as 100-240 VAC, or higher voltage AC power such as 277, 374, 480, or 600 VAC, or even pair-powered via ±137 VDC or ±180 VDC or other suitable power.

The simulations all showed that ground level vault deployments suffered from poor gain at street level. For example, referring to FIGS. 1 and 2, when an 8 dBi antenna 12 was located in an underground vault 14 with a plastic cover 6, the antenna 12, even when located at different positions, provided poor gain at ground level ("Angle in Degrees=−90"), ranging from 0 dBi to much lower. These simulation results agreed with earlier field measurements demonstrating poor RF coverage when an antenna is placed inside a vault. The field results show a best case reach of 50 meters and having a poorly controlled azimuth pattern. In all of these cases, RF reach was established to be at the −75 dBm threshold at the client device.

Figure 3:
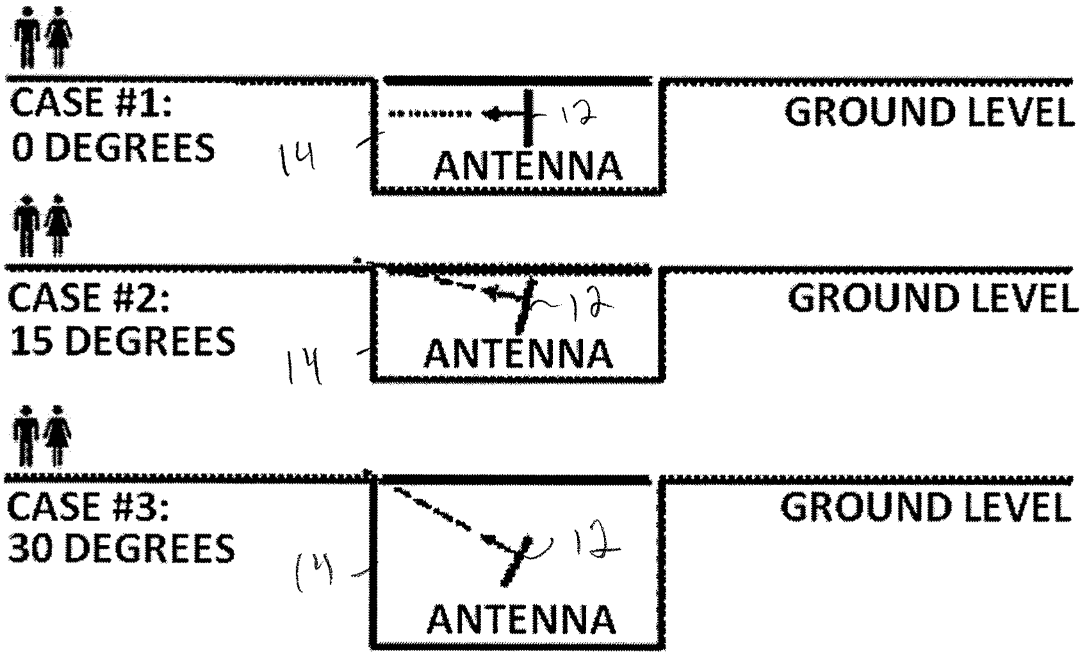
FIG. 3 illustrates several vault antenna angles used for simulations.
Figure 4:
FIG. 4 shows a graph of simulated vault antenna gains for the angles illustrated in FIG. 3.

Multiple additional simulations were also conducted. In the additional simulations, several aspects of the vault antenna system were varied—for example, referring to FIGS. 3 and 4, the position and angle of the antenna 12, and changing the gain of the antenna 12—were varied in an attempt to improve the gain of the vault antenna system. However, none were entirely successful. In all cases, the gain of the antenna 12 into the sky was very good, but along the street level was highly variable, but usually quite poor. In addition, detailed simulations for studying the current flow of the electrical charge have verified that none of the simulations showed acceptable current flow at ground level, which would achieve the desired result of a high gain antenna at street level.

In outdoor deployments, RF signals can “fringe” or edge-diffract around buildings. In electromagnetic wave propagation, edge diffraction (or the knife-edge effect) is a redirection by diffraction of a portion of the incident radiation that strikes a well-defined obstacle. The knife-edge effect is explained by Huygens-Fresnel principle, which states that a well-defined obstruction to an electromagnetic wave acts as a secondary source, and creates a new wavefront. This new wavefront propagates into the geometric shadow area of the obstacle. The term “fringe-effect” is used herein to describe edge diffraction or the knife-edge effect.

Figure 5:
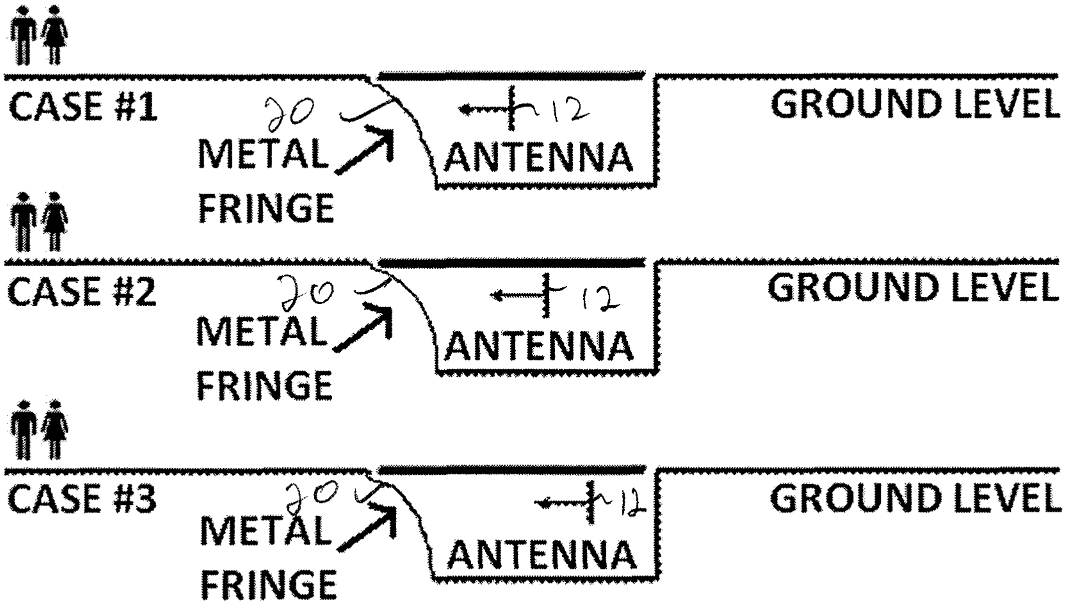
FIG. 5 illustrates several vault antenna locations together with a metal reflector for causing a fringe-effect according to a preferred embodiment of the present invention, as used for simulations.
Figure 6:
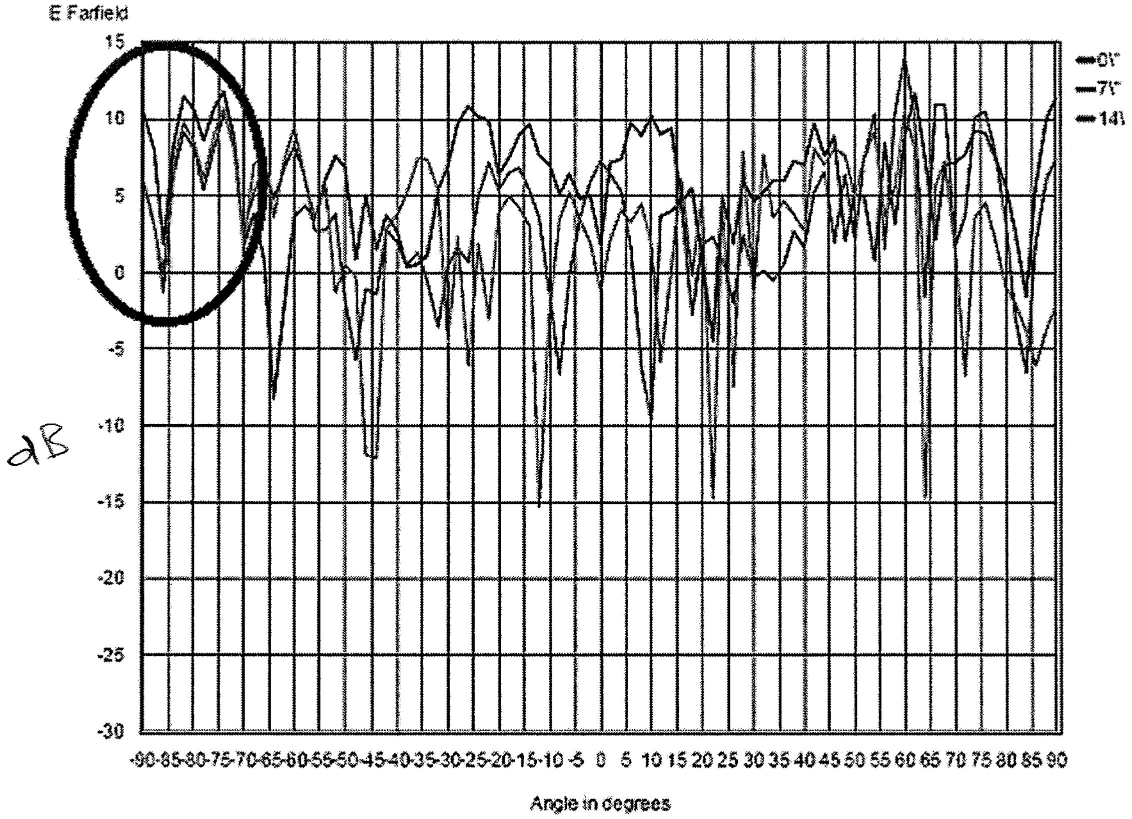
FIG. 6 shows a graph of simulated vault antenna gains for the locations and fringe effects illustrated in FIG. 5.

The design of a “fringe effect” into the vault antenna—i.e., a metallic edge for causing the radio signals from the antenna to “diffract” toward the ground—has also been modeled and simulated by the present inventors. The initial results have been promising, showing a consistent and repeatable antenna gain along the horizon/street level. These results are shown in FIGS. 5 and 6, in which the antenna 12 is illustrated as facing a curved sheet of metal 20 used to cause the fringing effect. The area of acceptable street level gain is highlighted in FIG. 6. As can be seen, the gain is consistent and repeatable.

Figure 7:
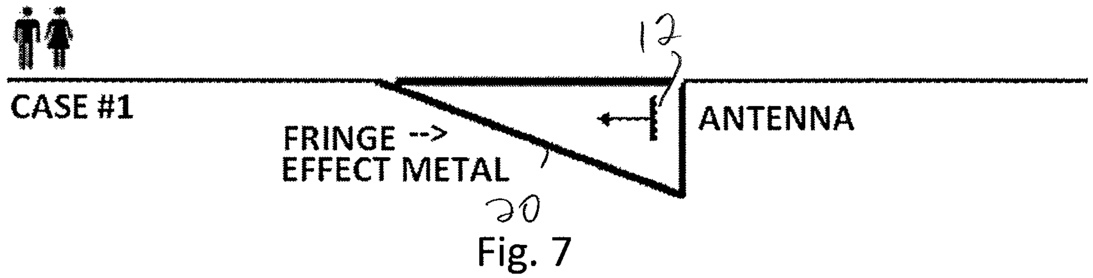
FIG. 7 illustrates a vault antenna configuration with a flat metal plate used as a reflector for causing a fringe-effect according to a preferred embodiment of the present invention.
Figure 8:
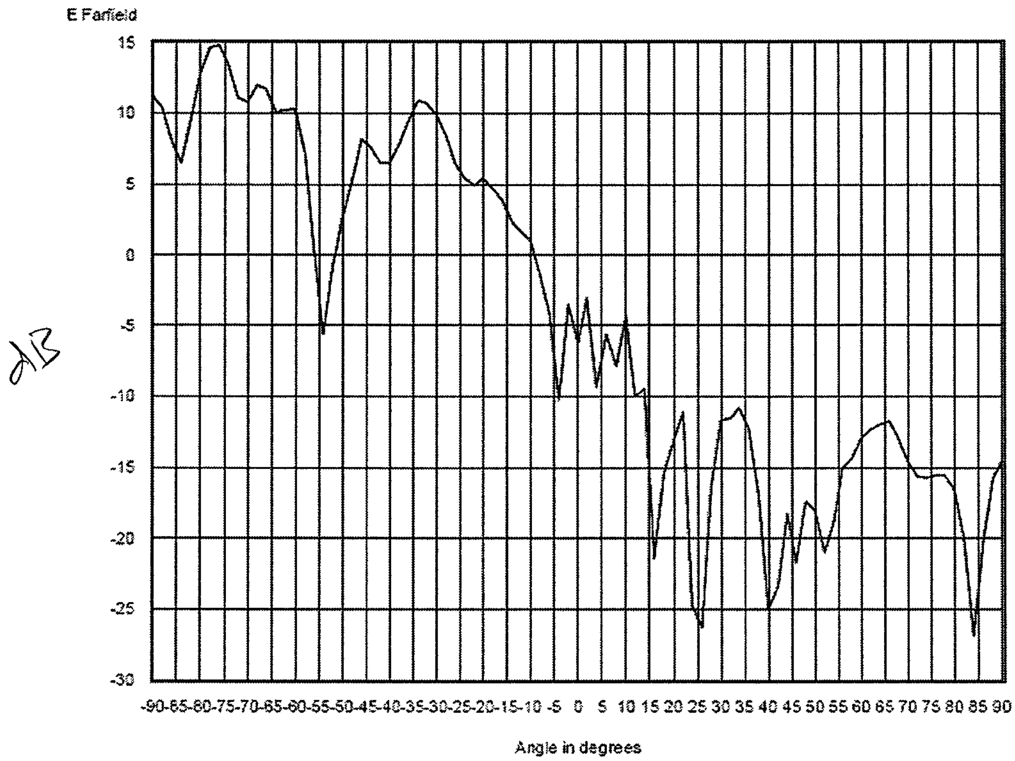
FIG. 8 shows a graph of simulated vault antenna gains for the antenna configuration illustrated in FIG. 7.

Additional simulations have been performed to test variations of metallic edges, and also to test antenna orientations to determine an optimal fringe effect antenna design for vaults. Referring to FIGS. 7 and 8, the results of these additional simulations have been very promising, with gains as high as 12 dBi along the horizon, and with good azimuth coverage from an 8 dBi antenna.

Figure 9:
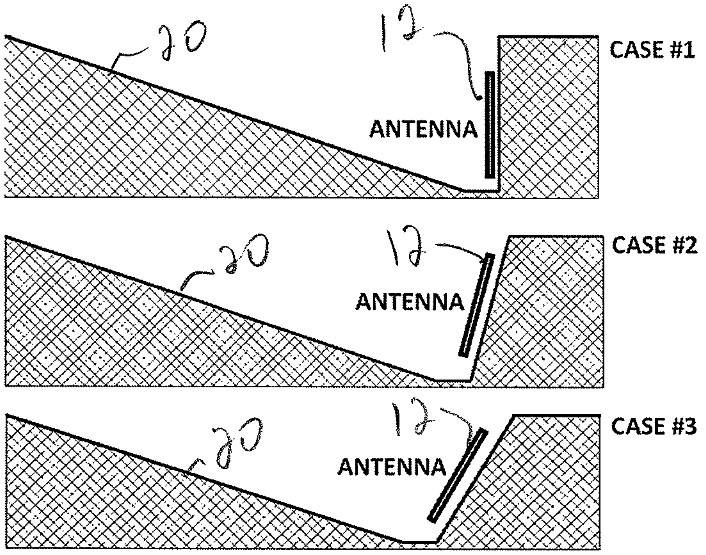
FIG. 9 illustrates several vault antenna tilt configurations for simulations.

Further simulations have been conducted to attempt to optimize the antenna tilt and relative position in the vault antenna bracket to determine optimal tilts. Referring to FIG. 9, three antenna tilt cases are illustrated; however, multiple variations have been verified.

In this manner, an innovative antenna system according to a preferred embodiments of the present invention has been designed and field-tested to verify functional operation. The description below explains the important fringe effects which are utilized and the means by which they are incorporated into a vault antenna according to a preferred embodiment of the present invention. Moreover, the present invention provides important aspects of the fringe effect vault antenna, including details of the mounting bracket, such as the relative location and tilt of the antenna element. Protective measures to ensure that a vault antenna operates correctly under adverse weather conditions which would result in flooding of the vault are also described. The present invention may be implemented by using different types of vault covers from different manufacturers, such as plastic vault covers manufactured by Pencell or concrete vault covers manufactured by NewBasis. Potential variations of the vault antenna, which allow for different orientations of vaults and different directional and omni-directional antenna solutions for coverage, are also described. Elevation directed antennas for building coverage are also disclosed. MIMO vault antennas are also disclosed.

With the evolution of the wireless industry to smaller cells utilizing the widely available asset of vaults, it is anticipated that vaults will become important, not only for WLAN—IEEE 802.11bgn and IEEE 802.11an coverage, but also for next generation cellular systems such as IEEE 802.16e, “LTE” or Long Term Evolution, or other such cellular standards.

Figure 23:
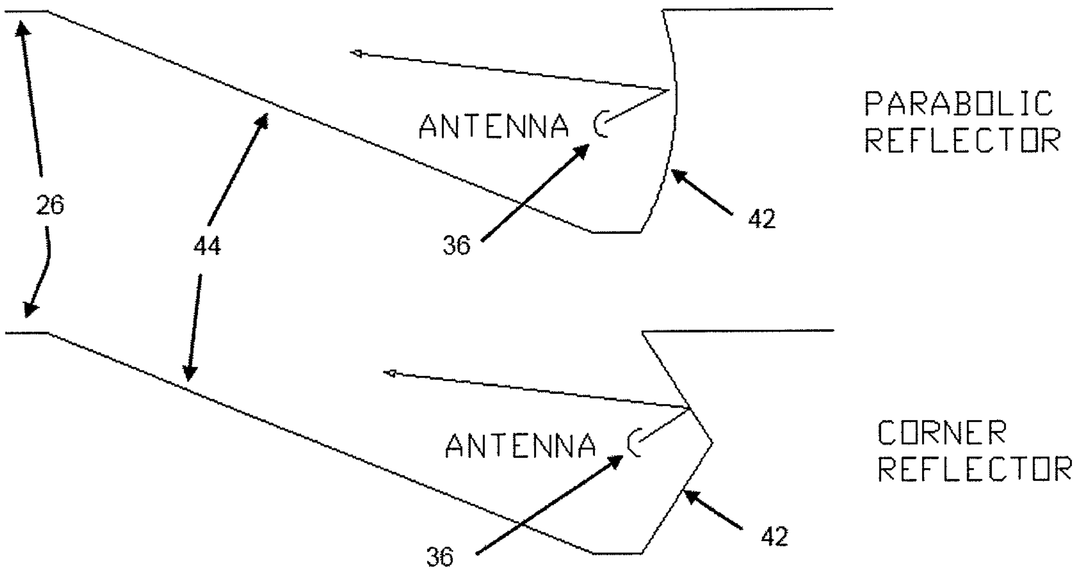
FIG. 23 shows a profile view of width-wise directional vault antennas with the deflectors having parabolic and corner reflector profiles.

There are at least two preferred embodiments of the vault antenna according to the present invention: the omni vault antenna and the directional vault antenna. Both preferred embodiments are intended for street coverage, although the directional vault antenna has multiple variations which enable coverage of tall buildings as well as street level coverage. These two embodiments are described below. Alternative embodiments of the present invention include parabolic and corner reflector vault antennas, which are similar to the directional vault antenna, but for which the shape of the deflector bracket is either parabolic or V-shaped as a corner reflector. FIG. 23 shows the cross-section of how the deflector metal can be shaped to be a corner reflector or parabolic reflector. An antenna 36 is directed towards the deflector reflector 42, whose radiated fields are then reflected towards the fringe-edge 26. An objective of these alternative embodiments of the present invention is to achieve both very high gain directional coverage of tall buildings by pointing the parabolic or corner reflector antenna with one or more antenna elements (for MIMO) at the building upper floors, while achieving a ground level fringe effect coverage for street level coverage. While most vaults will be at least partially below ground level (where the vault cover is slightly under ground), other implementations are contemplated where the cover is at ground level, or slightly above ground level. All such implementations are referred to as “substantially at ground level.”

In a preferred embodiment of the invention, the desired fringe-effect may be optimized by ensuring that the metal fringe completely covers the entire beamwidth of the signal azimuth for the received signal. The curvature of the metal fringe may vary from a completely flat fringe, as illustrated in FIG. 7, to any degree of curvature, as illustrated, for example, in FIG. 5. Regarding tilt, the tilt may be varied, as shown in FIG. 9. Experimental results have shown that the tilt is optimized (i.e., peak antenna gain is achieved) when the boresight of the antenna is aligned with the direction of the signal beam. These results also show that the orientation of the metal fringe is optimized when the horizontal aspect of the signal beam is aligned with the metal fringe edge.

Omni Vault Antenna.

Figure 10:
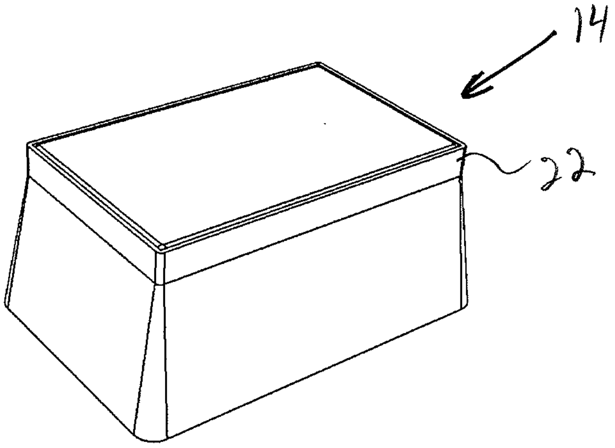
FIG. 10 shows a vault.
Figure 11:
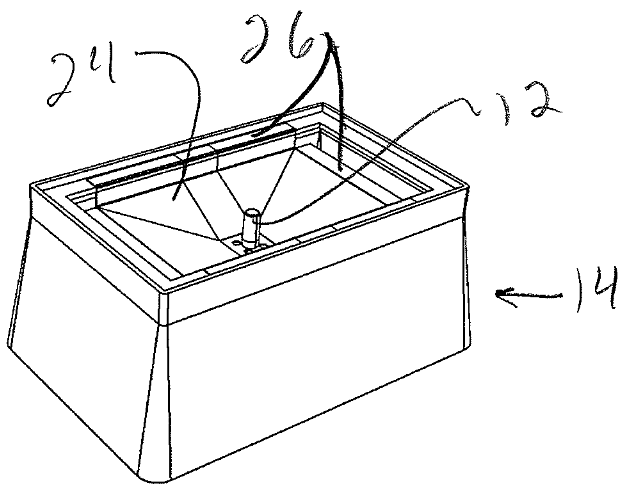
FIG. 11 shows the vault of FIG. 10 with the cover removed, thereby exposing an omni-directional vault antenna.

The omni vault antenna provides an effective means of omni-directional coverage of a street or open venue. This antenna is located in a ground level vault (where the top of the vault is at ground level, or slightly thereabove or therebelow; and the antenna is below ground level) and includes one or more omni-directional antennas mounted in a bracket which slopes upwards to the edge of the vault. Referring to FIG. 10, a vault 14 is typically at least partially (often completely) buried in the ground—either in a street, or in a sidewalk, or in soil. The vault 14 is typically made of concrete or high strength plastic. Referring to FIG. 11, the vault 14 of FIG. 10 is shown with the lid or cover 22 removed. Circuitry typically contained within such vaults is not show in the drawings, for clarity. The vault antenna structure is shown and includes an omni antenna 12 in the center section of the vault 14, with a supporting metallic bracket 24 which slopes upward from the antenna element to guide the antenna signals upward and toward the edge 26 of the vault 14. The fringe effect is realized when the RF signals transitions across the top edge 26 of the metallic bracket 24.

Figure 12:
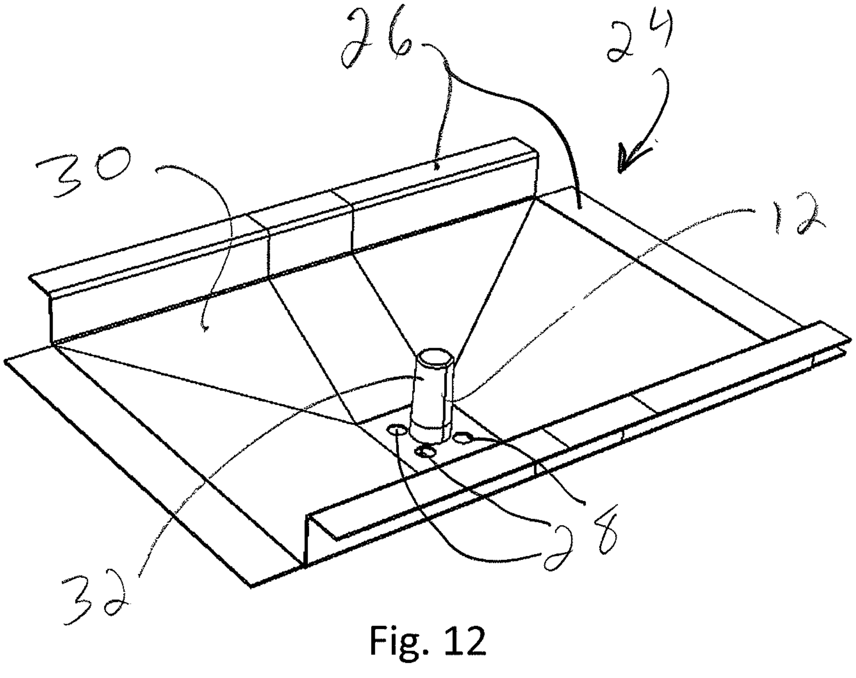
FIG. 12 shows an omni-directional vault antenna according to a preferred embodiment of the present invention.

Referring to FIG. 12, the omni-directional vault antenna 12 is illustrated in greater detail. FIG. 12 shows a single omni antenna 12 in the center area, although for MIMO systems, multiple omni-directional antenna elements would typically be used in this area. Surrounding the omni-directional antenna 12 are drain holes 28 which ensure that water does not pool around the antenna 12 when the vault 14 becomes flooded during rainy periods. The antenna deflector plate 30 slopes upward towards the edges 26 of the vault cover 22 (not shown in FIG. 12). In a preferred embodiment, this deflector plate 30 is made from aluminum sheet metal, substantially 1.5 mm to substantially 4.0 mm thick, but could be formed from any other metal or other radio reflective material, such as steel, metalized plastic, or a wire mesh product in which the mesh holes are small compared to the wavelength of the radio frequency signals being transmitted. While the bracket 24, edge 26, and plate 30 are shown as comprising one integral piece of metal, embodiments are contemplated wherein these pieces are separate and assembled on-site or in a manufacturing or assembly facility.

As shown in FIG. 12, the omni-directional antenna 12 has an integrated plastic radome 32 which acts to protect the antenna element 12 from water ingress for the case where the vault becomes flooded, as vaults occasionally do. Alternatively, a bell jar may be employed with attachment points either to the deflector plate, or to the vault cover. The antenna deflector and bracket combination generally slopes upward and away from the antenna 12 with a largely continuous edge 26 just below the vault cover. The upward slope, combined with the largely continuous edge of the antenna being located at or near the ground level, diffracts the radio waves, causing them to bend towards the ground, thereby resulting in a higher effective antenna gain along the ground.

Directional Vault Antenna.

Figure 13:
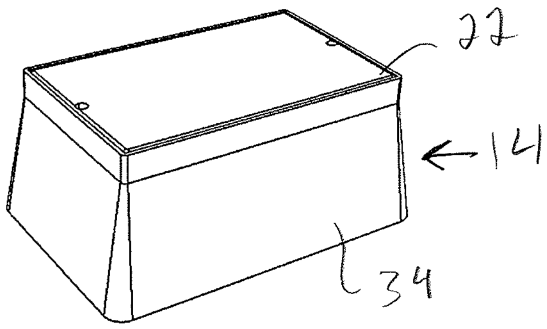
FIG. 13 shows a vault.
Figure 14:
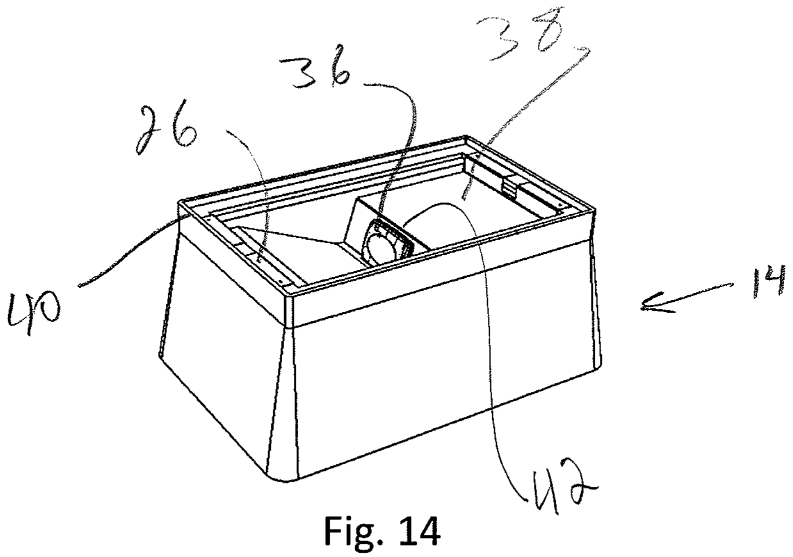
FIG. 14 shows the vault of FIG. 13 with the cover removed, thereby exposing a directional vault antenna according to a preferred embodiment of the present invention.
Figure 15:
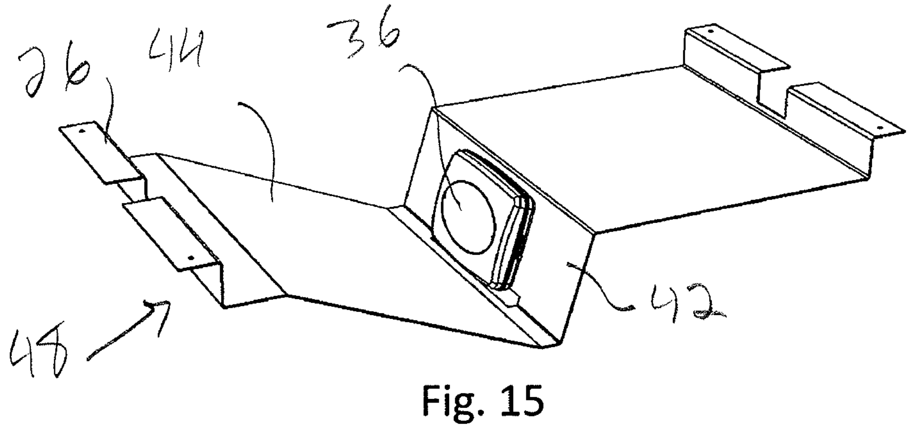
FIG. 15 shows a perspective view of a lengthwise directional vault antenna according to a preferred embodiment of the present invention.
Figure 16:
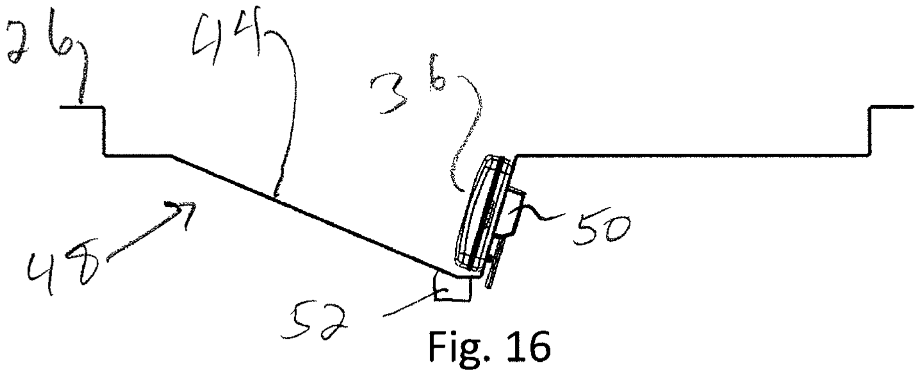
FIG. 16 shows a profile view of a lengthwise directional vault antenna according to a preferred embodiment of the present invention.
Figure 17:
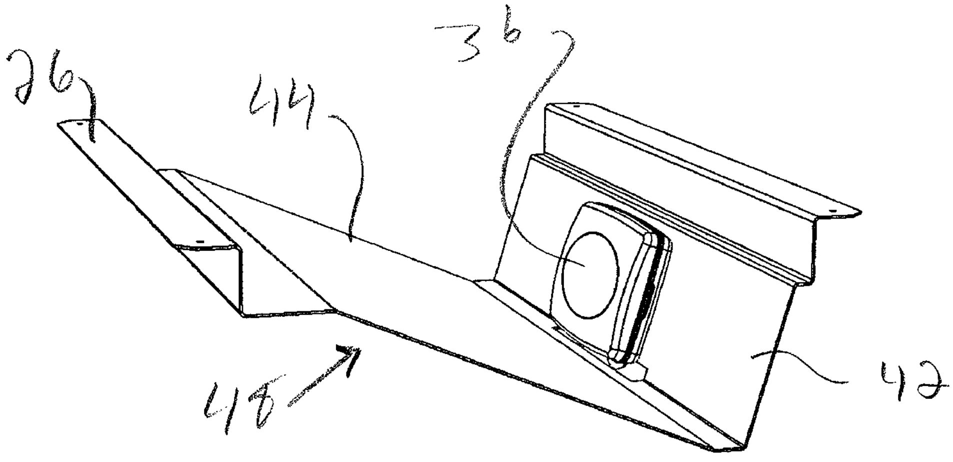
FIG. 17 shows a perspective view of a width-wise directional vault antenna according to a preferred embodiment of the present invention.
Figure 18:
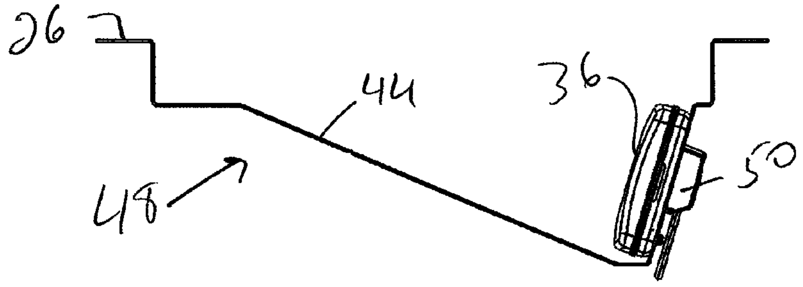
FIG. 18 shows a profile view of a width-wise directional vault antenna according to a preferred embodiment of the present invention.
Figure 19:
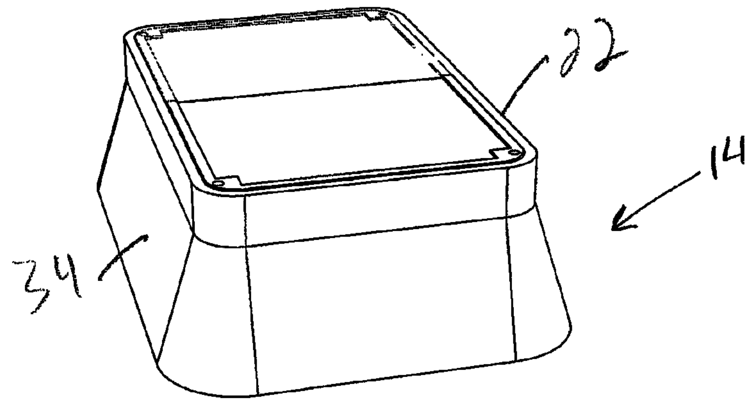
FIG. 19 shows a perspective view of a vault.
Figure 20:
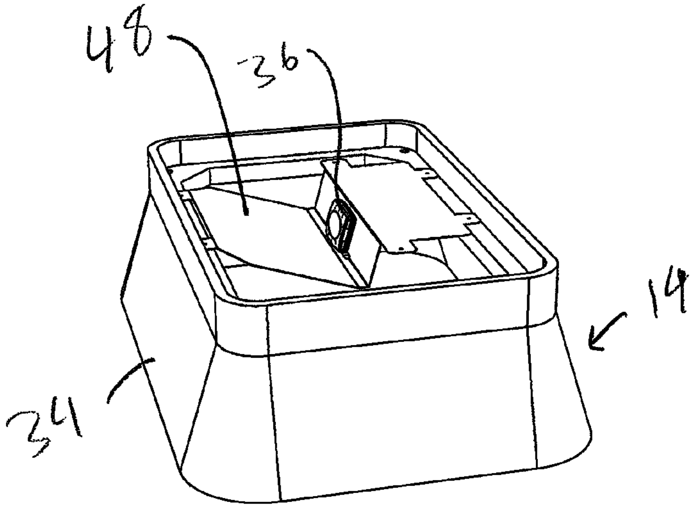
FIG. 20 shows a perspective view of the vault of FIG. 19 with the cover removed, thereby exposing a directional vault antenna according to a preferred embodiment of the present invention.
Figure 21:
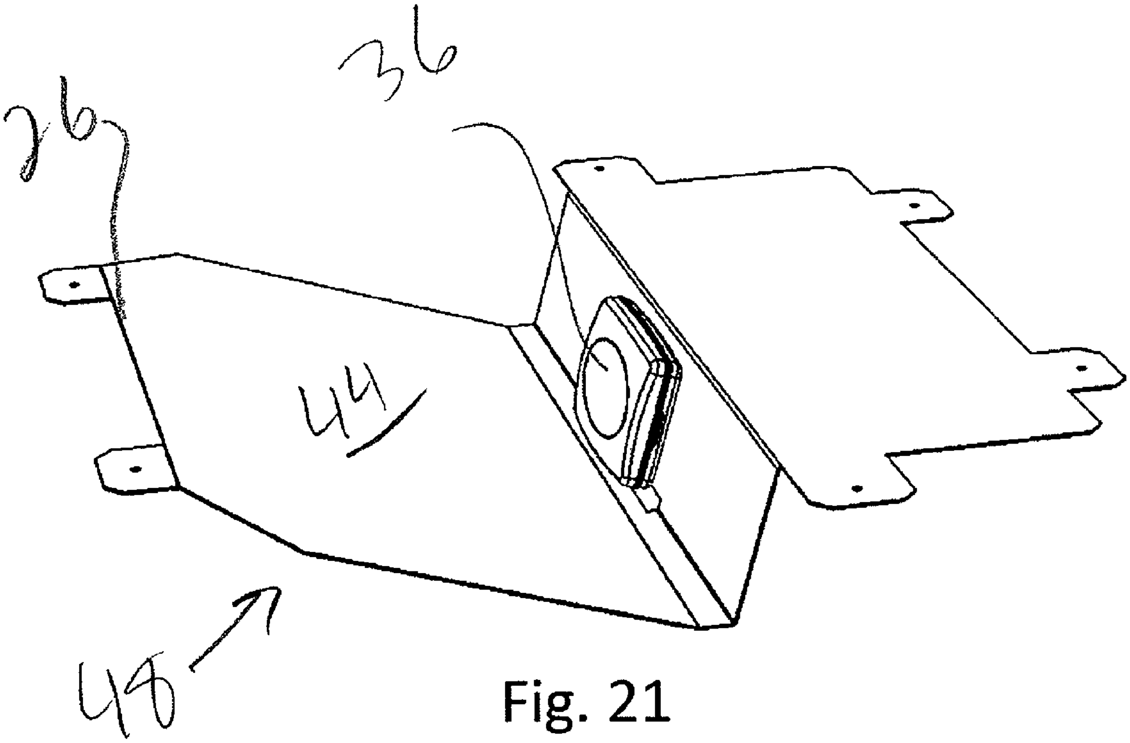
FIG. 21 shows a perspective view of the directional vault antenna of FIG. 20 according to a preferred embodiment of the present invention.
Figure 22:
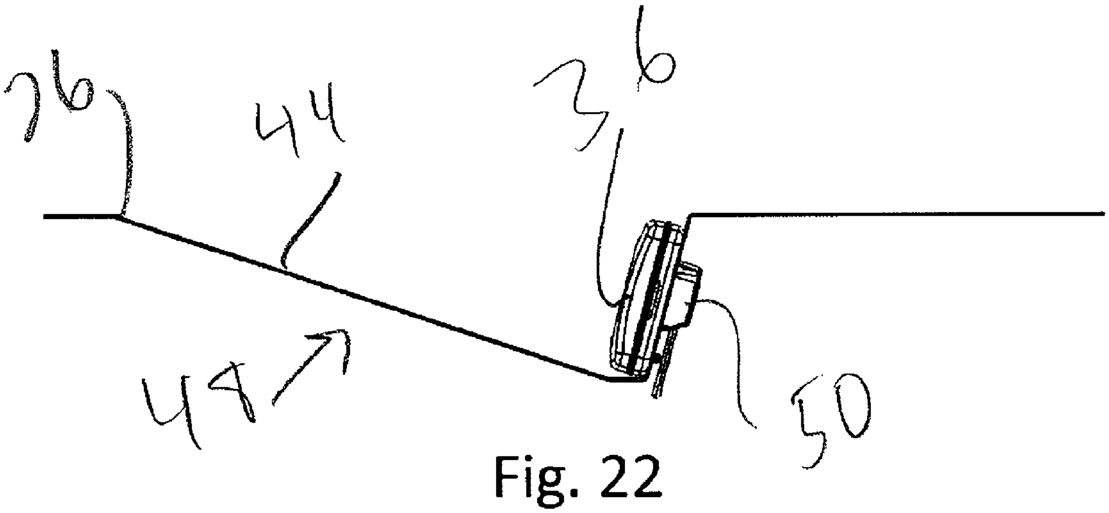
FIG. 22 shows a profile view of the directional vault antenna of FIG. 20 according to a preferred embodiment of the present invention.

A directional vault antenna provides an effective means of directional coverage of a street or open venue. This antenna, located in a substantially ground level vault, includes one or more directional antenna elements mounted in a bracket which slopes upwards to the edge of the vault. Referring to FIG. 13, a vault 14 having a plastic reinforced cover 22 and a plastic base 34 is illustrated. Referring to FIG. 14, the vault 14 of FIG. 13 is shown with the lid or cover 22 removed. The vault antenna structure includes a directional antenna 36 in the middle of the vault, supported by the deflector bracket 38 which slopes upward from the antenna element to guide the antenna signals upward and toward the edge or lip 40 of the vault 14. The fringe effect occurs along the top edge 26 of the metallic bracket 38.

Referring to FIGS. 15-22, perspective and profile views of several commercially available antennas 12 are shown. There are many vault manufacturers, and each has a wide selection of vaults and sizes. The vaults are normally longer than they are wide, and are usually at least partially buried such that the longer dimension aligns with the direction of the street. Two types of directional vault antennas, lengthwise-mount and widthwise-mount, offer flexibility as to the areas that can be targeted by the directional vault antenna, according to the preferred embodiments.

The directional vault antenna preferably includes a single directional antenna 36 in the center area 42, although for MIMO systems, multiple directional antenna elements would typically be used. At the base of the directional antenna are drain holes (not shown in FIGS. 13-22 which ensure that water does not pool around the antenna 36 when the vault becomes flooded during rainy periods. The antenna deflector plate 44 slopes upward towards the desired top edge 26 of the vault. This deflector plate 44 uses radio reflecting materials similar to the omni-directional deflector bracket 24 described above. As with the omni directional vault antenna embodiments, a bell jar may be employed with attachment points either to the deflector plate or to the vault cover to ensure that water does not affect the antenna 36 or associated RF cable (not shown).

The directional antenna deflector bracket 48 generally slopes upward and away from the antenna 36 with a largely continuous edge 26 just below the vault cover. The upward slope, combined with the largely continuous edge of the antenna being located at or near the ground level that diffracts the radio waves causing them to bend towards the ground, resulting in a higher effective antenna gain along the ground. One or more tilt structures 50 may be provided to tilt the antenna 36 (in azimuth and/or elevation) to beam-steer the RF signals as desired. Likewise, an adjusting mechanism 52 may be provided to change the angle, elevation, slope, and/or the position of the plate 44 in order to adjust adjusting or steer the main beam of the antenna 36.

Figure 1:
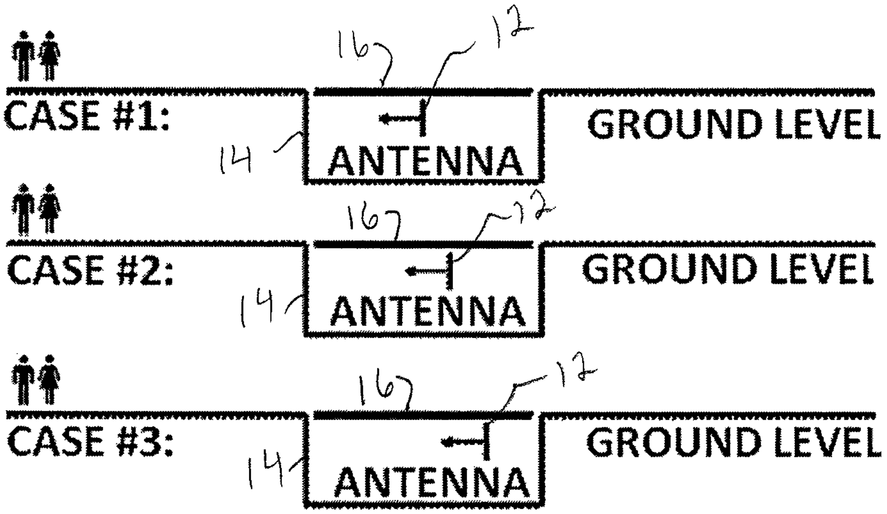
FIG. 1 illustrates several vault antenna locations used for simulations.
Figure 2:
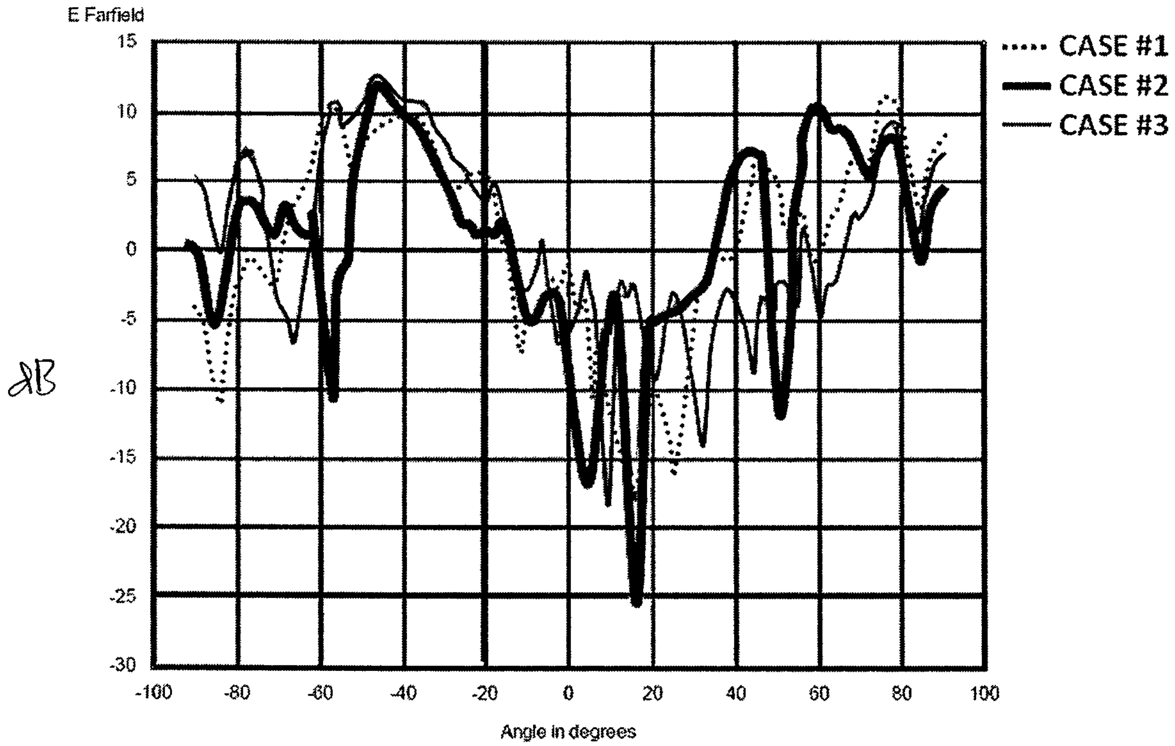
FIG. 2 shows a graph of simulated vault antenna gains for the locations illustrated in FIG. 1.

In an alternative embodiment of the present invention, an active high-power vault antenna that does not include a metal edge diffractor may be provided. For example, a Wi-Fi™ transceiver that uses a vault antenna may be implemented, provided that sufficient gain can be obtained with a vault antenna that does not include a metal edge diffractor. If the antenna in FIG. 1 is replaced with an active high-power antenna, the gain may be sufficient at all required elevation angles.

In another alternative embodiment of the present invention, an RF transceiver using an antenna according to the description above may be implemented. Such a transceiver may be implemented as a multiband transceiver, a multicarrier transceiver system, or as a multiband, multicarrier transceiver system.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. A fringe-effect vault directional antenna, comprising:

a communications vault having a non-conductive cover disposed substantially at ground level;

an antenna element coupled to a mounting bracket and positioned in the communications vault; and a rectangular metallic reflector coupled to said mounting bracket disposed substantially adjacent said antenna element, said rectangular metallic reflector having four vertically-sloped surfaces coupled to a substantially horizontal straight edge at an upper end of the vertically-sloped surface, the edge being positioned substantially parallel to the ground, the metallic reflector and the edge being configured to cause a fringe effect upon the RF signals of the antenna to cause said RF signals to bend in a direction toward the ground.

2. The fringe-effect vault antenna of claim 1, wherein the antenna element is disposed below ground level.

3. The fringe-effect vault antenna of claim 1, wherein the non-conductive vault cover is disposed slightly below ground level.

4. The fringe-effect vault antenna of claim 1, wherein the non-conductive vault cover is disposed at ground level.

5. The fringe-effect vault antenna of claim 1, wherein the non-conductive vault cover is disposed slightly above ground level.

6. The fringe-effect vault antenna of claim 1, wherein the non-conductive vault cover comprises a material selected from a group consisting of concrete, concrete polymer, and plastic.

7. The fringe-effect vault antenna of claim 1, wherein the antenna element is attached to the vault cover.

8. The fringe-effect vault antenna of claim 1, wherein the antenna element is supported by the metallic reflector.

9. The fringe-effect vault antenna of claim 1, wherein the metallic reflector comprises a sloped bracket configured to direct the RF signals toward the antenna element.

10. The fringe-effect vault antenna of claim 1, further including elevation tilt structure configured to tilt an elevation of the antenna such that a main beam of the RF signal is positioned toward said edge.

11. The fringe-effect vault antenna of claim 1, further including azimuth tilt structure configured to tilt an azimuth of the antenna.

12. The fringe-effect vault antenna of claim 1, further comprising an adjusting structure configured to adjust the reflector such that a main beam of the antenna element can be steered.

13. The fringe-effect vault antenna of claim 1, further comprising a mounting bracket configured such that the antenna element may be mounted in one of (i) lengthwise within the vault, and (ii) widthwise within the vault.

14. The fringe-effect vault antenna of claim 1, further comprising a bell jar attached to the vault cover, the bell jar being configured to maintain an air pocket around the antenna element.

15. The fringe-effect vault antenna of claim 1, wherein the vertically-sloped surface is integral with the substantially horizontal straight edge.

16. A fringe effect vault antenna system, comprising:
- an antenna element coupled to a mounting bracket and;
- a vault cover;
- a metallic deflector plate coupled to the mounting bracket having four vertically-sloped surfaces and a substantially straight edge coupled to a top portion of each vertically-sloped portion to provide a fringe effect to signals of the antenna; and
- a radio frequency cable, the antenna element, the deflector plate, and the radio frequency cable being integrated together into the vault cover, and the radio frequency cable being configured to couple energy from a received radio frequency signal into the at least one antenna element.

17. A system for providing WLAN or cellular radio coverage, the system comprising:
- at least one wireless transceiver;
- a means of wired connectivity; and
- the fringe effect vault antenna of claim 16.

18. The system of claim 17, wherein the means of wired connectivity is selected from the group consisting of DOCSIS, DSL, ADSL, HDSL, VDSL, T1, and E1.

19. The system of claim 17, wherein the antenna element is configured to enable wide-band, multi-carrier operation.

20. The system of claim 17, wherein the at least one wireless transceiver comprises a plurality of wireless transceivers, and further comprising a plurality of antenna elements, each of the plurality of antenna elements corresponding to a different one of the plurality of wireless transceivers.

21. Fringe-effect RF omni-directional antenna structure, comprising:
- an antenna element coupled to a mounting bracket;
- a rectangular deflector coupled to said mounting bracket and having four vertically-sloped portions each configured to intersect a main beam of said antenna element; and
- a substantially straight edge coupled to a top portion of each vertically-sloped portion and positioned to have a fringe-effect on the RF signals of said antenna element to bend the RF signals in a direction downward from said substantially straight edge.

22. Structure according to claim 21, wherein said mounting bracket, said deflector, and said edge comprise one integral piece.

23. A method of propagating RF signals with respect to a communication vault having an antenna element below ground level, comprising:
- disposing a rectangular vertically-sloped deflector having four portions to intersect a main beam of the antenna element wherein said deflector and antenna are coupled to a mounting bracket; and
- disposing a substantially straight edge coupled to a top portion of each vertically-sloped portion to cause a fringe effect on the RF signals of said antenna element to bend the RF signals in a direction toward the ground level.

* * * * *